United States Patent
Arai et al.

(10) Patent No.: US 7,335,296 B2
(45) Date of Patent: Feb. 26, 2008

(54) SYSTEM AND DEVICE FOR PROCESSING SUPERCRITICAL AND SUBCRITICAL FLUID

(75) Inventors: Kunio Arai, Sendai (JP); Hiroshi Inomata, Sendai (JP); Richard Lee Smith, Jr., Sendai (JP)

(73) Assignee: Tohoku Techno Arch Co., Ltd. (JP)

( * ) Notice: Subject to any disclaimer, the term of this patent is extended or adjusted under 35 U.S.C. 154(b) by 418 days.

(21) Appl. No.: 10/486,907

(22) PCT Filed: Oct. 9, 2002

(86) PCT No.: PCT/JP02/10509

§ 371 (c)(1),
(2), (4) Date: Feb. 17, 2004

(87) PCT Pub. No.: WO03/035240

PCT Pub. Date: May 1, 2003

(65) Prior Publication Data

US 2004/0232072 A1    Nov. 25, 2004

(30) Foreign Application Priority Data

Oct. 26, 2001    (JP)    ............................. 2001-329638

(51) Int. Cl.
*B01D 17/12*    (2006.01)
(52) U.S. Cl. ...................... 210/138; 165/108; 165/138; 165/200; 210/149; 210/175; 210/194; 210/511; 422/116; 422/198; 422/234; 422/242

(58) Field of Classification Search ............... 210/138, 210/143, 149, 175, 511, 634, 194; 134/10, 134/109–111; 422/116, 129, 198, 234, 242; 23/295 R, 299; 165/108, 138, 200
See application file for complete search history.

(56) References Cited

U.S. PATENT DOCUMENTS

| | | | | |
|---|---|---|---|---|
| 4,824,570 A | * | 4/1989 | Bethuel et al. | 210/511 |
| 5,783,243 A | * | 7/1998 | Benado | 426/425 |
| 5,938,927 A | * | 8/1999 | Reich et al. | 210/634 |
| 6,082,150 A | * | 7/2000 | Stucker | 68/18 R |
| 6,312,528 B1 | * | 11/2001 | Summerfield et al. | 134/40 |
| 2002/0114853 A1 | * | 8/2002 | Krasutsky et al. | 424/725 |

FOREIGN PATENT DOCUMENTS

JP    2000-117222    4/2000

* cited by examiner

*Primary Examiner*—Joseph Drodge
(74) *Attorney, Agent, or Firm*—Hayes Soloway P.C.

(57) ABSTRACT

A system for processing supercritical and subcritical fluid capable of bringing the inside of at least one processing container (1) formed in a flow passage into a supercritical or subcritical high pressure field, wherein thermal operation is applied to process fluid to apply thermal expansion to the fluid to produce a pressure difference between the processing container (1) and the outside, whereby a specified temperature and the high pressure field suitable for the processing of the supercritical or subcritical fluid can be provided in the processing container (1).

18 Claims, 13 Drawing Sheets

SYSTEM AND DEVICE FOR PROCESSING SUPERCRITICAL AND SUBCRITICAL FLUID

FIELD OF THE INVENTION

The present invention relates to a system and device for processing supercritical and subcritical fluid for providing a high pressure field to various high-pressure fluid using processes, which dispenses with a movable machine such as high-pressure pump or compressor to conduct an extraction separation, reactive synthesis, crystallization or the like by use of a supercritical or subcritical fluid.

BACKGROUND ART

In an extraction process or reaction process using supercritical fluid or subcritical fluid, various high-pressure generating machines such as pump and compressor are used to bring the fluid into a supercritical or subcritical high-pressure field. The use of such high-pressure machines has problems such as leak of high-pressure fluid, generation of dust from movable parts, and noise. Particularly, the necessity of high-level special knowledge for the maintenance of the high-pressure machines obstructs the application of high-pressure processes to various operations.

Carbon dioxide and water, which are extremely safe materials as fluid, are expected for the application to general operations such as extraction, cleaning, and waste disposal as environmentally suitable materials, but the use of the high-pressure generating machines significantly obstructs the spread of these supercritical fluid processes. Further, the effectiveness of various reactions in supercritical fluid has been found out. However, the use of such high-pressure generating machines obstructs the extension of laboratory research areas.

Further, the pressure condition for operation or experiment is limited depending on the specifications of high-pressure generating machines, which makes a proper condition selection difficult in various aspects. For example, in supercritical carbon dioxide extraction, where an increase in pressure progresses in its operating condition, an extracting operation at 500 atm is becoming mainstream at present, whereas devices lower in pressure than this are mostly used in laboratory. Furthermore, a further increase in pressure is desired for this pressure, and operations at 700 and 1000 atms are also being required.

In the selection of a compressor used for high-pressure operation, the model of compressor is generally determined depending on operating pressure range, fluid flow rate or the like. However, since the kind, flow rate, pressure or the like of fluid in a supercritical or subcritical fluid process is frequently differed from that in a general chemical process, the selection of compressor is not easy. In the process using supercritical fluid where the increase in pressure further progresses as described above, the compressor itself is also often specific, and the selection thereof is one of serious factors in considerations of economical efficiency.

On the other hand, a method using no pump in extraction process and other processes using supercritical or subcritical fluid is proposed (Japanese Patent No. 3079157: Extraction and cleaning system using supercritical fluid as solvent). However, this method asks the drive source for fluid transportation of density difference, and has a limitation in the transfer of a differential pressure in fluid transportation. For example, when a condenser and an evaporator are set to generate the differential pressure by use of the density difference between gas and liquid, a considerable vertical interval must be taken since a head is given by the vertical interval between the condenser and the evaporator, which limits the setting place. Further, the diameter of piping for transportation and fittings such as valve must be determined considering a pressure loss, and a respectable design is required for a large flow rate processing.

Recently, syntheses of various chemical materials such as caprolactam by an instantaneous reaction in supercritical water have been also progressively developed. However, these require that the resident time in a reactor is several seconds or less, and instantaneous cooling to about 100° C. is performed after the end of reaction. In order to realize them, operations almost ignoring economical efficiency have been carried out, including largely excessive supply of high-pressure water preliminarily heated to a reaction temperature or higher to the reactor and further largely excessive supply of cooling water late in the reaction are performed, and such operations have a bad effect on the industrialization.

The present invention thus has an object to provide a system and device for processing supercritical and subcritical fluid capable of efficiently forming a high pressure field in a process using high-pressure fluid such as supercritical or subcritical fluid without using a special compressing device by substantially giving a pressure difference by the state quantity change of the fluid by transfer of only thermal energy.

DISCLOSURE OF THE INVENTION

To attain the above object, the present invention involves a system for processing supercritical and subcritical fluid capable of bringing the inside of at least one processing container formed in a flow passage into a supercritical or subcritical high pressure field, wherein thermal operation is applied to process fluid to apply thermal expansion to the fluid to produce a pressure difference between the processing container and the outside, whereby a desired temperature and the high pressure field suitable for the processing of the supercritical or subcritical fluid can be provided in the processing container.

According to this feature, the temperature, pressure and volume change (PVT change) of high-pressure fluid by thermal energy is actively utilized to give a pressure difference substantially by the change in state quantity of the fluid or only by thermal energy, whereby a high pressure field can be efficiently provided in a process using high-pressure fluid such as supercritical or subcritical fluid without using a special compressing device.

To attain the above object, in the system for processing supercritical and subcritical fluid of the present invention, the fluid filled in a high-pressure device connected to the processing container through a flow passage is heated to generate a thermal expansion in the high-pressure device, and the fluid laid in a prescribed temperature and pressure state is fed into the processing container by use of its own pressure generated by the thermal expansion.

According to this feature, since the fluid laid in the prescribed temperature and pressure state is fed from the high-pressure device into the processing container by its own pressure in the high-pressure device generated by the thermal expansion, the providing of a feeding pump device is dispensed with.

To attain the above object, in the system for processing supercritical and subcritical fluid of the present invention, at least two or more high-pressure devices are connected to the processing container through flow passages, and when at least one high-pressure device thereof supplies the fluid to the processing container, the other high-pressure devices are laid in a thermal expansion process within the high-pressure device or a fluid feed waiting state.

According to this feature, since a plurality of high-pressure devices (cylinders) can continuously and steadily feed the high-pressure fluid into the processing container successively, the inside of the processing container can be stably kept in a desired pressure and flow rate state.

To attain the above object, in the system for processing supercritical and subcritical fluid of the present invention, the flow passages including the processing container and the high-pressure devices basically constitute a circulating passage, and the fluid is circulated therein so that at least the fluid passed through the processing container and the high-pressure devices is returned to the condenser and refilled in the high-pressure devices.

According to this feature, since the used fluid can be reused, resource saving can be attained, and the energy loss can be also minimized.

To attain the above object, in the system for processing supercritical and subcritical fluid of the present invention, the high-pressure device has a flow passage for filling the fluid from the condenser, a flow passage connected to the processing container, and a flow passage connected to the condenser, and the opening and closing timings thereof are controlled by control valve devices, respectively.

According to this feature, since the high-pressure device is heated in the state where both the control valve devices are closed, and the processing container-side valve device is opened at the stage where a desired pressure is attained, the fluid sufficiently raised to the prescribed pressure is fed into the processing container, and the inside of the processing container can be regularly kept in a stable pressure and temperature state.

To attain the above object, the present invention involves a device for processing supercritical and subcritical fluid processing capable of bringing the inside of at least one processing container formed in a passage into a supercritical or subcritical high pressure field, wherein at least two or more heatable high-pressure devices are connected to the processing container through flow passages, the respective passages have valve devices, and the opening and closing timings of the valve devices are controlled so that the other high-pressure devices are laid in a thermal expansion process in the high-pressure devices or in a fluid feed waiting state when at least one high-pressure device thereof supplies the fluid into the processing container.

According to this feature, since a plurality of high-pressure devices (cylinders) can continuously and steadily feed the high-pressure fluid into the processing container successively by controlling the opening and closing timings of the valve devices, the inside of the processing container can be stably kept in a desired pressure and flow rate state.

To attain the above object, in the device for processing supercritical and subcritical fluid of the present invention, a liquid storage part is connected to at least the upstream side of the high-pressure devices through a valve device, and the processing container is connected to the downstream side through a valve device, so that the internal pressure of the high-pressure devices can be enhanced to a prescribed pressure by at least temporarily closing both the valve devices in heating of the high-pressure devices.

According to this feature, since the high-pressure devices are heated in the closed state of both the control valve devices, and the processing container-side valve device is opened at the stage where a desired pressure is attained, the fluid sufficiently raised to a prescribed pressure is fed into the processing container, and the inside of the processing container can be regularly kept in a stable pressure and temperature state.

To attain the above object, in the device for processing supercritical and subcritical fluid of the present invention, the processing container is used as extractor, reactor, washer, dyeing machine, crystallizer or the like, or an extractor, reactor, washer, dyeing machine, crystallizer or the like is attached to the processing container.

According to this feature, since the high-pressure field obtained in the processing container is used as the reactor, extractor, washer or the like, the flowing state and temperature distribution of the fluid can be freely controlled in the processing container, and the processing work thereof can be rapidly and efficiently performed.

To attain the above object, in the device for processing supercritical and subcritical fluid of the present invention, the flow passages including the processing container and the high-pressure devices are constituted as a circulating passage including an evaporator and a condenser, and the fluid is circulated so that at least the fluid passed through the processing container and the high-pressure devices is returned to the evaporator and condenser, and refilled in the high-pressure devices.

According to this feature, the fluid circulating flow can be generated by the combination with the evaporator, the condenser and the like to dispense with a pump, and the reuse of the used fluid enables resource saving and minimization of energy loss.

BEST MODE FOR CARRYING OUT THE INVENTION

Figure 1:
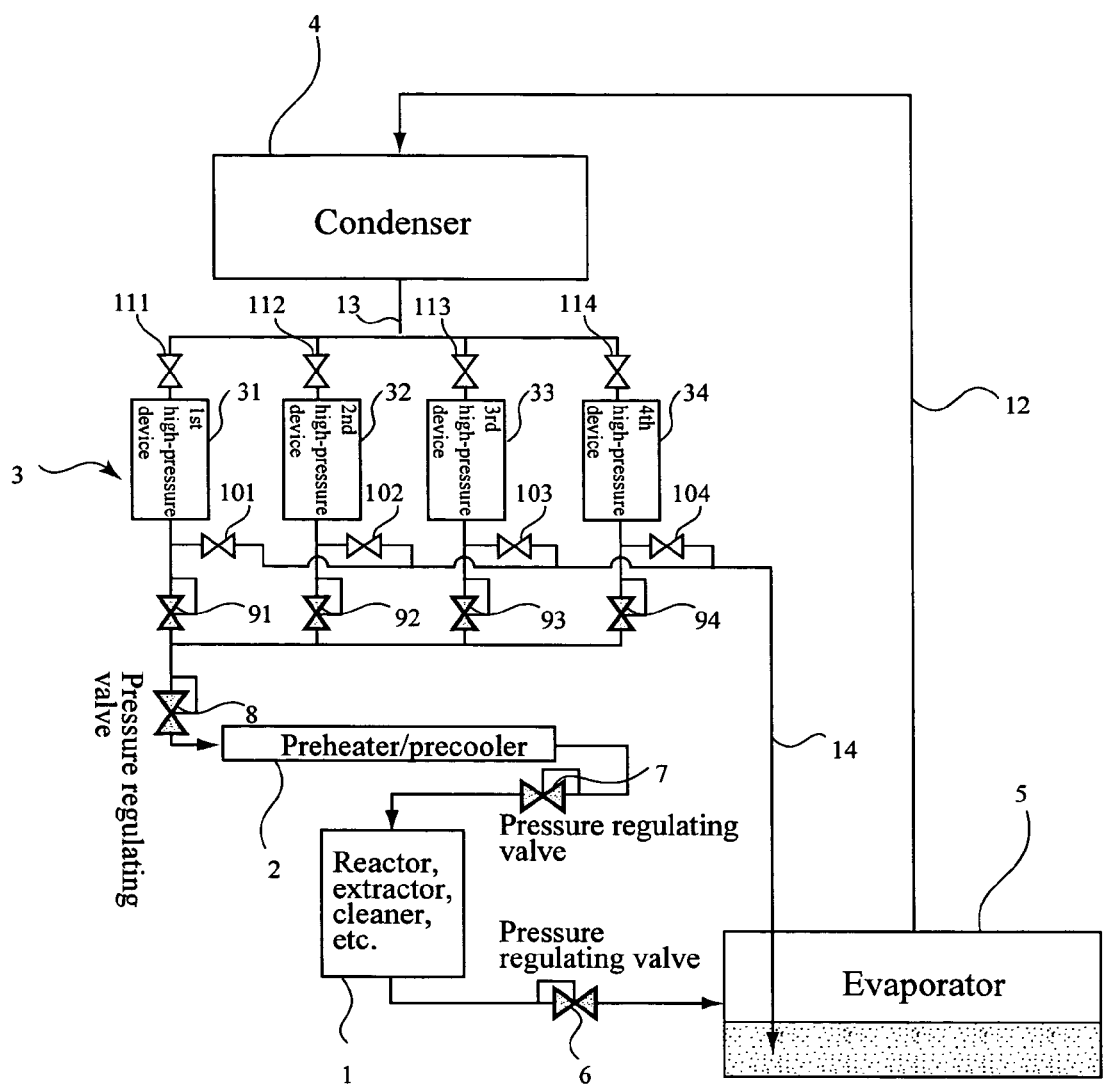
FIG. 1 is a block view showing a basic example of a circulating type device for processing supercritical and subcritical fluid.

Preferred embodiments of the present invention are then described based on the drawings. FIG. 1 shows a basic example of a circulating type supercritical and subcritical fluid processing device. Partially abstracted processing flows (system flows) are shown in FIGS. 2-7, and partially abstracted processing flows (system flows) in a one-way type supercritical and subcritical fluid processing device are shown in FIGS. 8-13.

The fluid used in the system for processing supercritical and subcritical fluid of the embodiments, or a solvent includes water, an alcohol such as methanol, ethanol or propanol, a hydrocarbon such as paraffin or olefin, a liquefied gas such as carbon dioxide or ammonia, or a mixture thereof.

The device of FIG. 1 has a closed circuit constituting a circulating passage, which includes a processing container 1 functioning as extractor, reactor, washer, dyeing machine, crystallizer or the like, which contributes to a process field; a high-pressure device 3 (31, 32, 33, 34) functioning as a 4-cylinder high-pressure generating device; an evaporator 5; a condenser 4; and a preheater/precooler 2 arranged between the high-pressure device 3 and the processing container 1, each of which is connected through a closed passage.

The inside of the high-pressure device 3 (31, 32, 33, 34) and the extractor, reactor, washer, dyeing machine, crystallizer or the like as the processing container 1 for executing a processing using high-pressure fluid are subjected to heat insulating treatment, and a polymer, ceramic or the like is used as the heat insulating material.

Figure 2:
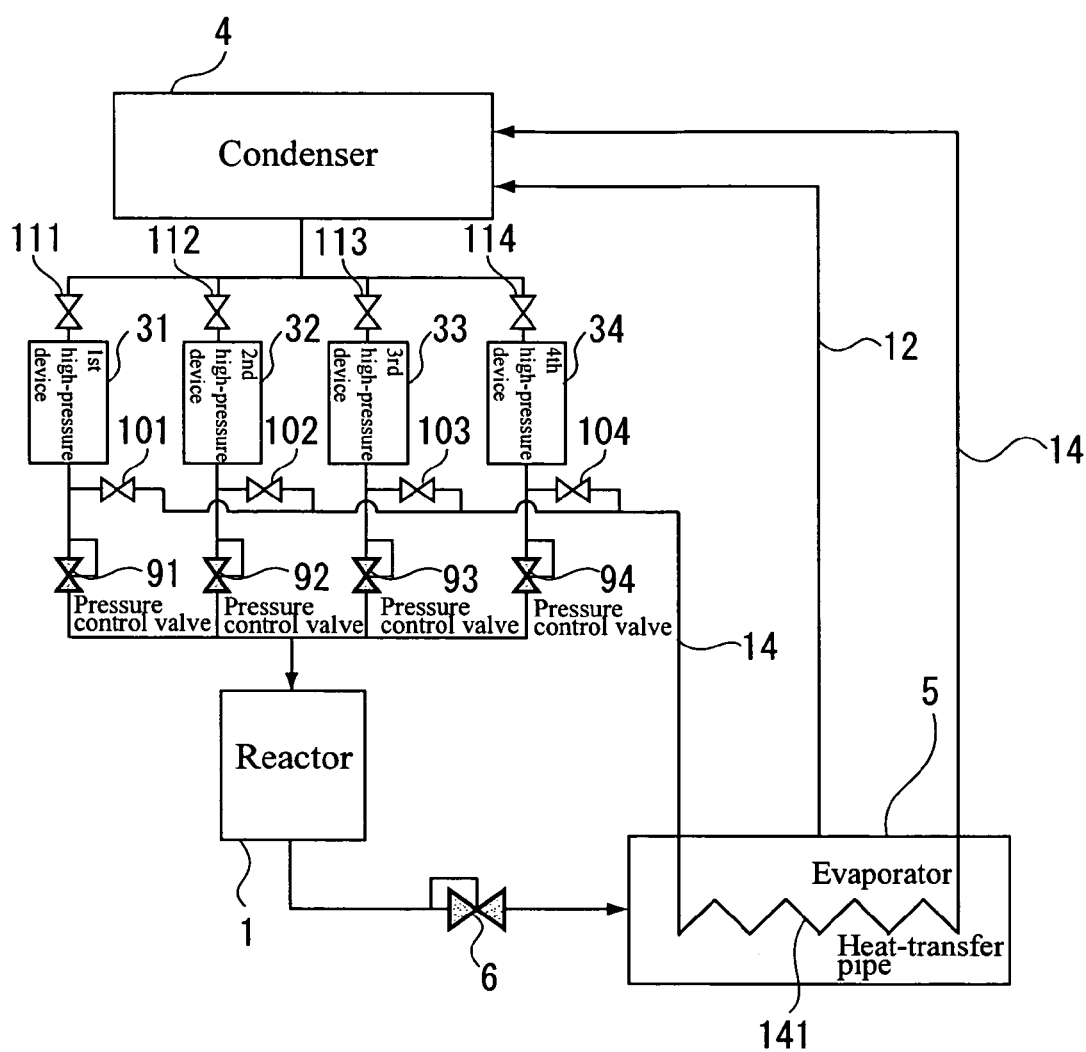
FIG. 2 is a processing flow chart (system flow) in the device for processing supercritical and subcritical fluid of FIG. 1.
Figure 3:
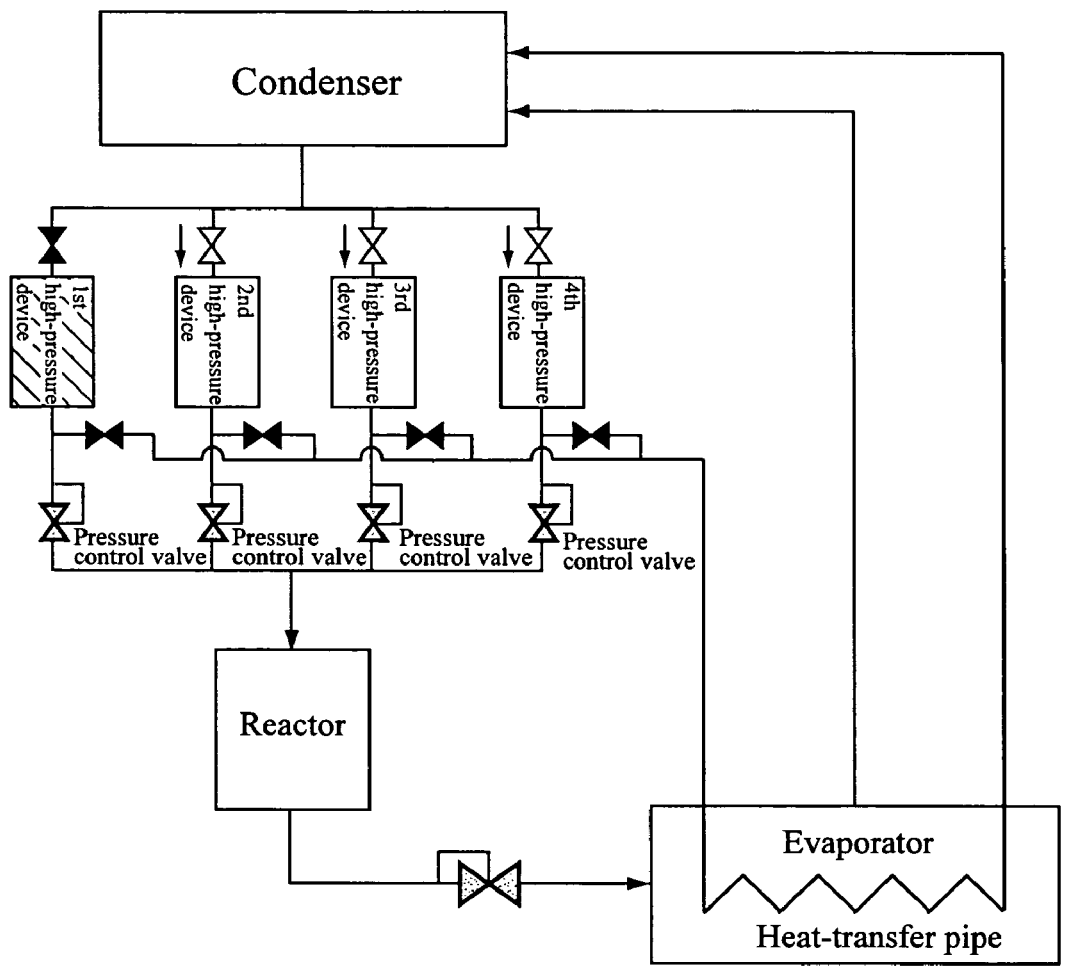
FIG. 3 is a processing flow chart (system flow) in the device for processing supercritical and subcritical fluid of FIG. 1.

Further, the high-pressure device 3 (31, 32, 33, 34) has a heating part in the inside, and an electric heater, hot water, steam, heat medium, high frequency or the like is used as the heating source. The fluid is circulated so that at least the fluid passed through the high-pressure device 3 and the processing container 1 is returned to the evaporator 5 and the condenser 4, and refilled in the high-pressure device 3, and a heat-transfer pipe 141 is arranged in the evaporator, as shown in FIG. 2, to recover the thermal energy of the high-pressure generating device by the heater for effective use.

In more detail, flow passages are formed from the condenser 4 for storing the fluid returned from the evaporator 5 through a passage 12 to four high-pressure devices in this example (1st high-pressure device 31, 2nd high-pressure device 32, 3rd high-pressure device 33 and 4th high-pressure device 34) through a duct line 13, and they are provided with valves 111, 112, 113, and 114, respectively. A cooling device may be properly provided in the condenser 4 to cool the high-temperature fluid circulated from the evaporator 5 to a prescribed temperature. The fluid is automatically circulated by the mutual functions of the evaporator 5 and the condenser 4, and a drive device such as pump can be thus omitted.

This device further has flow passages connected from the 1st high-pressure device 31, the 2nd high-pressure device 32, the 3rd high-pressure device 33, and the 4th high-pressure device 34 to the processing container 1, and a flow passage 14 directly connected to the evaporator. The flow passages connected to the processing container 1 have pressure control valves 91, 92, 93 and 94, and the passage 14 directly connected to the evaporator has valves 101, 102, 103 and 104. Further, the preheater/precooler 2 is provided on the downstream side of the pressure control valves 91, 92, 93 and 94 through a pressure regulating valve 8, and the preheater/precooler 2 is connected to the processing container 1 through a pressure regulating valve 7. The processing container 1 is connected to the evaporator 5 through a pressure regulating valve 6.

A working example of a supercritical carbon dioxide processing using carbon dioxide as process solvent is described based on FIGS. 2-7. A subsequent-stage container such as reactor used in a high-temperature and high-pressure field is provided with at least one raw material supplying line in addition to a high-pressure fluid supplying line that is a closed passage.

TABLE 1

Operation Example of Supercritical Carbon Dioxide Processing (Temp: ° C., Press: MPa)

| Operation of High-pressure Device | | 1st high-pressure device (20 L) | | 2nd high-pressure device (20 L) | | 3rd high-pressure device (20 L) | | 4th high-pressure device (20 L) | |
|---|---|---|---|---|---|---|---|---|---|
| | | Temp | Press | Temp | Press | Temp | Press | Temp | Press |
| Cycle 1 | Connection Heating Discharge Pressure lowering | 15 | 5.087 | 15 | 5.087 | 15 | 5.087 | 15 | 5.087 |
| Cycle 2 | Connection Heating Discharge Pressure lowering | 15 > 45 | 5 > 21 | 15 | 5.087 | 15 | 5.087 | 15 | 5.087 |
| Cycle 3 | Connection Heating Discharge Pressure lowering | 45 > 150 | 21 | 15 > 45 | 5 > 21 | 15 | 5.087 | 15 | 5.087 |

TABLE 1-continued

Operation Example of Supercritical Carbon Dioxide Processing (Temp: ° C., Press: MPa)

| | | | | | | | | | | |
|---|---|---|---|---|---|---|---|---|---|---|
| Cycle 4 | Connection | | | | | | 15 > 45 | 5 > 21 | 15 | 5.087 |
| | Heating | | | 45 > 150 | 21 | | | | | |
| | Discharge | | | | | | | | | |
| | Pressure lowering | 150 > 31 | 5.087 | | | | | | | |
| Cycle 5 | Connection | 15 | 5.087 | | | | | | | |
| | Heating | | | | | | | | 15 > 45 | 5 > 21 |
| | Discharge | | | 45 > 150 | 21 | | | | | |
| | Pressure lowering | | | 150 > 31 | 5.087 | | | | | |
| Cycle 6 | Connection | | | 15 | 5.087 | | | | | |
| | Heating | 15 > 45 | 5 > 21 | | | | | | | |
| | Discharge | | | | | | | | 45 > 150 | 21 |
| | Pressure lowering | | | 150 > 31 | 5.087 | | | | | |

| | Operation of High-pressure Device | Reactor (20 L) | | Evaporator (50 L) | | Condenser (50 L) | | Heat-transfer pipe (0.5 L) | |
|---|---|---|---|---|---|---|---|---|---|
| | | Temp | Press | Temp | Press | Temp | Press | Temp | Press |
| Cycle 1 | Connection Heating Discharge Pressure lowering | 15 | 5.087 | 15 | 5.087 | 15 | 5.087 | 15 | 5.087 |
| Cycle 2 | Connection Heating Discharge Pressure lowering | 15 | 5.087 | 15 | 5.087 | 15 | 5.087 | 15 | 5.087 |
| Cycle 3 | Connection Heating Discharge Pressure lowering | 40 | 20 | 15.81 | 5.187 | 14.09 | 4.976 | 15 | 5.087 |
| Cycle 4 | Connection Heating Discharge Pressure lowering | 40 | 20 | 15.81 | 5.187 | 14.09 | 4.976 | 15 >150 >31 | 5 >21 >5 |
| Cycle 5 | Connection Heating Discharge Pressure lowering | 40 | 20 | 15.81 | 5.187 | 14.09 | 4.976 | 31 >150 >31 | 5 >21 >5 |
| Cycle 6 | Connection Heating Discharge Pressure lowering | 40 | 20 | 15.81 | 5.187 | 14.09 | 4.976 | 31 >150 >31 | 5 >21 >5 |

An operation example is shown in Table 1. Liquefied carbon dioxide is supplied to the whole system as operation preparation (Cycle 1). All the valves are opened, as shown in FIG. 2, to lay the whole system in a communicating state. In this example, all the valves 101, 102, 103 and 104 and the valves 111, 112, 113 and 114 are controlled in opening and closing timing by computer control. It is apparent that part of the valves may be manually operated. In this example, the pressure control valves 91, 92, 93 and 94 and the pressure regulating valve 6 are automatic pressure control valves having the function of automatically releasing the fluid to the secondary side or downstream side when the primary or upstream pressure reaches a set pressure. In the drawing, a blanked valve shows an opened state, and a blackened one shows a closed state.

Figure 4:
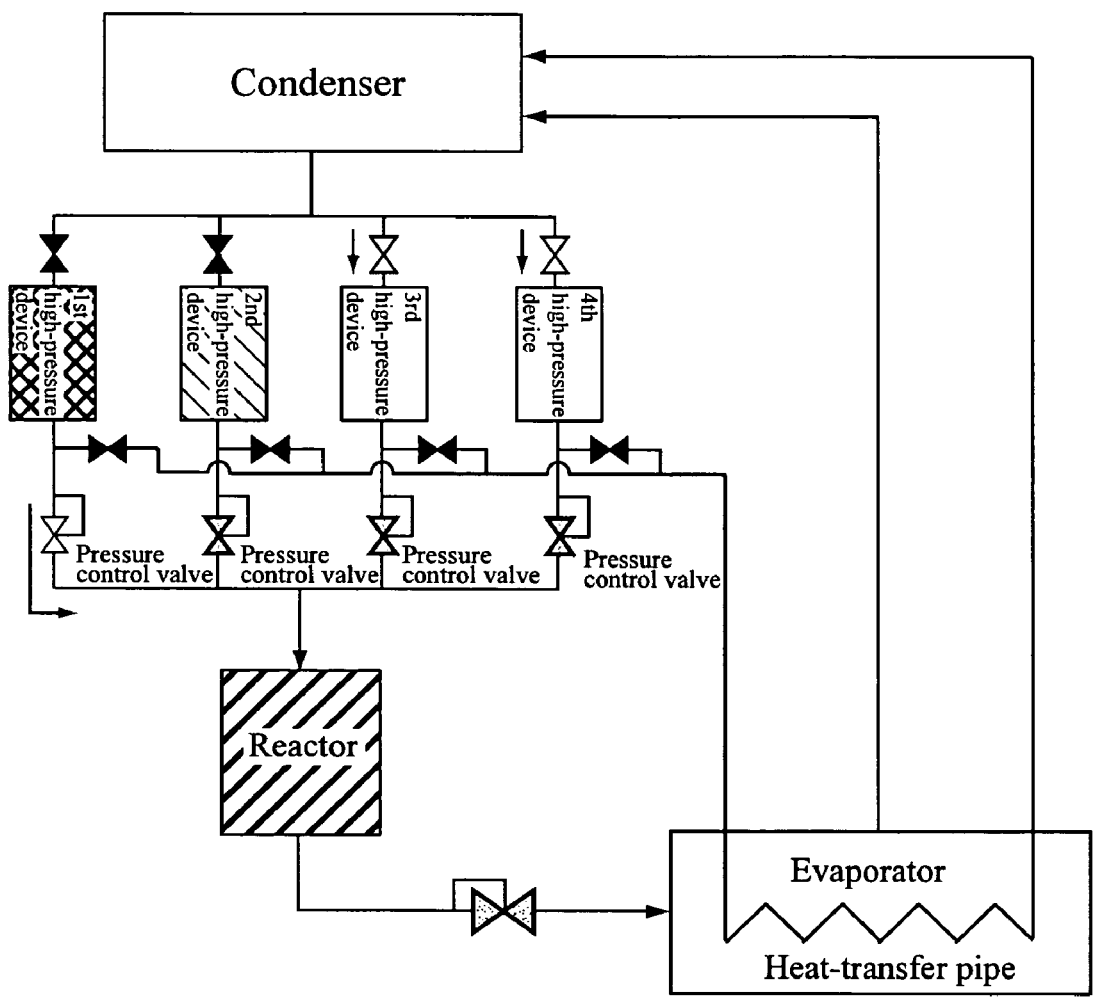
FIG. 4 is a processing flow chart (system flow) in the device for processing supercritical and subcritical fluid of FIG. 1.

In the state of FIG. 2, the temperature and pressure of carbon dioxide in each component equipment were 15° C. and 5.087 MPa. The heating of the 1st high-pressure device 31 is started (Cycle 2). The valve 111 between the 1st high-pressure device 31 and the condenser is closed, and the valves 112, 113 and 114 between each of the 2nd high-pressure device 32, the 3rd high-pressure device 33 and the 4th high-pressure valve 34 and the condenser 4 are opened. The pressure control valves 91, 92, 93 and 94 and the valves 101, 102, 103 and 104 are also laid in closed state. The 1st high-pressure device 31 is instantaneously raised to a prescribed pressure because it is heated within the heat-insulating container. The heating required for the arrival of a pressure set by the pressure control valve 91 (primary pressure releasing pressure) 21 MPa was 45° C. Namely, when the first high-pressure device reaches 21 MPa as shown in FIG. 4, the pressure control valve 91 attached thereto is operated to supply the carbon dioxide (supercritical carbon dioxide) in the 1st high-pressure device 31 to the reactor that is the processing container 1 set to 40° C. while insulating heat (Cycle 3). In the stage of Cycle 3, the 1st high-pressure device 31 is in a discharging state for supplying supercritical carbon dioxide to the reactor 1, and the operation is continued until 150° C. that is the set temperature of the 1st high-pressure device 31 is attained. The valve 112 is also closed in this process, and the 2nd high-pressure device 32 is transferred to a heating state.

On the other hand, when reaching 150° C. that is the set temperature of the 1st high-pressure device 31, the valve 101 is opened to carry the fluid in the 1st high-pressure device 31 to the condenser 4 through the flow passage 14 and the evaporator 5, and a pressure lowering operation is executed so as to have the same pressure as the condenser 4 (Cycle 4). At the end of the stage of Cycle 4, the temperature and pressure of carbon dioxide in the 1st high-pressure device 31 are returned to 31° C. and 5.087 MPa. In the stage of Cycle 4, the pressure control valve 92 is opened, and the supply of carbon dioxide to the reactor 1 is switched to the 2nd high-pressure device 32 which reaches a prescribed pressure.

Figure 6:
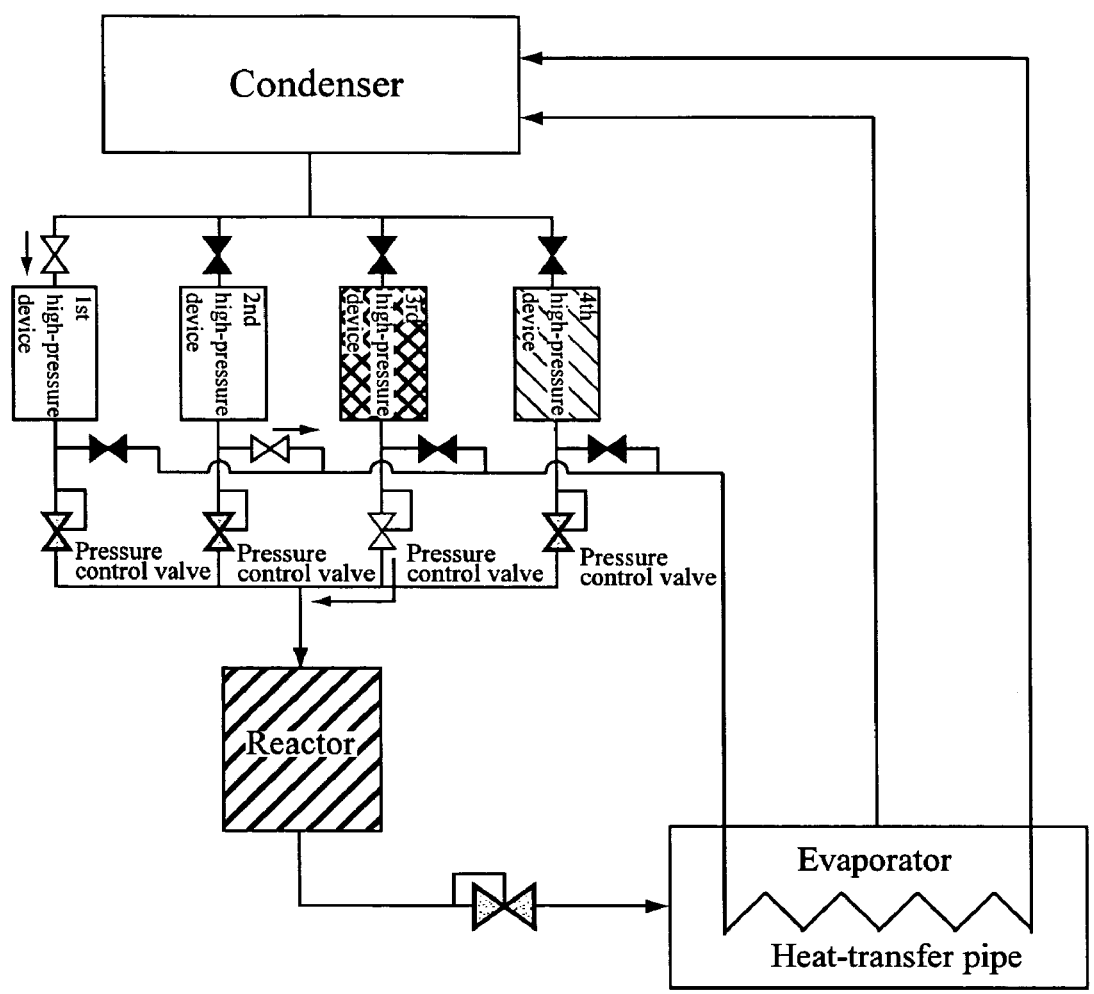
FIG. 6 is a processing flow chart (system flow) in the device for processing supercritical and subcritical fluid of FIG. 1.

When the pressure of the 1st high-pressure device 31 is equal to that of the condenser 4, the valve 111 is opened as shown in FIG. 6, and the first high-pressure device 31 is connected to the condenser 4 to supply liquefied carbon dioxide to the 1st high-pressure device 31 (Cycle 5). In the stage of Cycle 5, the supply of carbon dioxide to the reactor 1 is switched to the 3rd high-pressure device 33, and the 2nd high-pressure device 32 is transferred to the pressure lowering operation similarly to the 1st high-pressure device 31.

Figure 7:
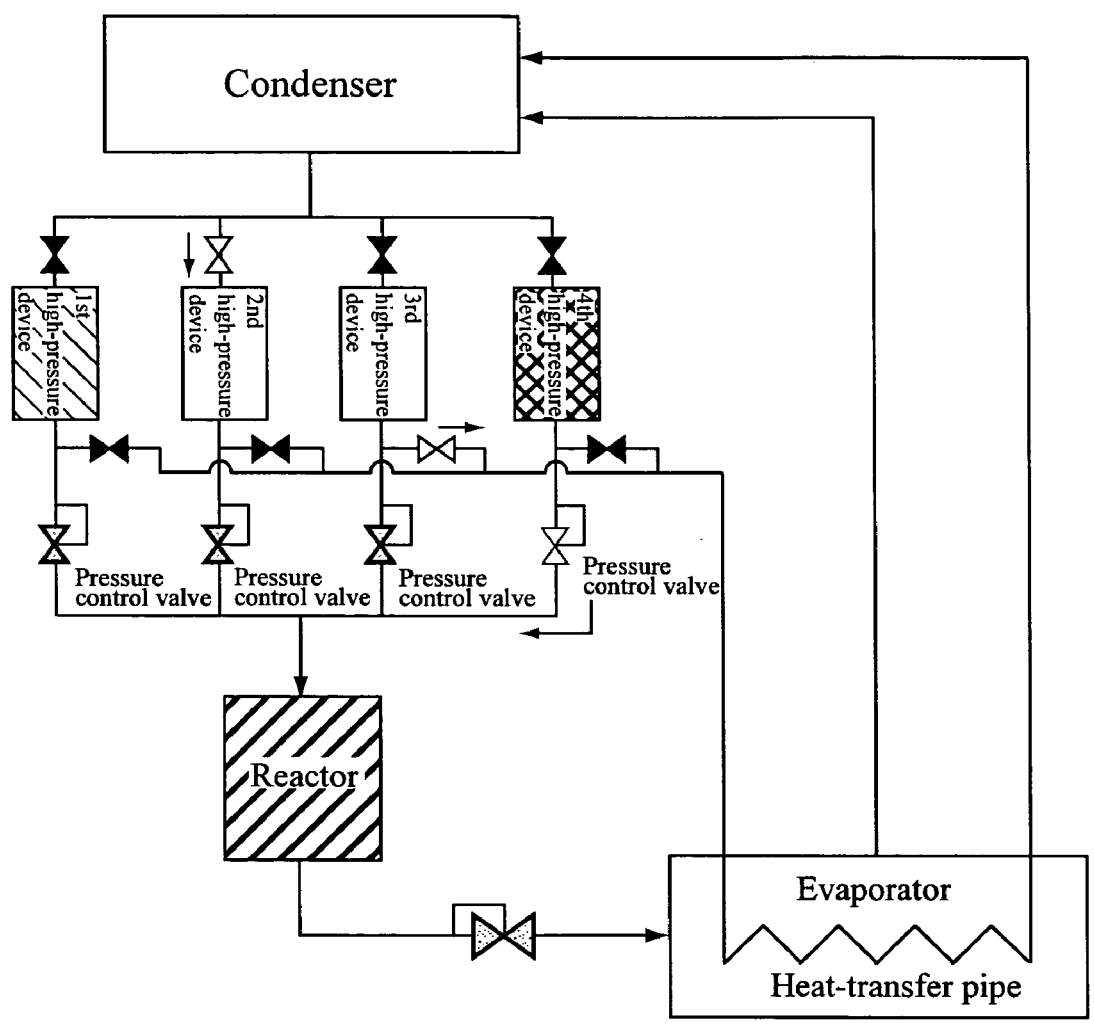
FIG. 7 is a processing flow chart (system flow) in the device for processing supercritical and subcritical fluid of FIG. 1.

The 1st high-pressure device 31 is then subjected to heating operation again as shown in FIG. 7 (Cycle 6), and the 2nd high-pressure device 32 is also transferred to the liquefied carbon dioxide supplying state by the connection with the condenser 4 and the 3rd high-pressure device 33 is also transferred to the pressure lowering operation, each other. In the stage of Cycle 6, the supply of carbon dioxide to the reactor 1 is switched to the 4th high-pressure device 34.

The above operation is repeated, whereby the supercritical carbon dioxide is continuously supplied to the reactor 1.

A working example of a supercritical water processing using water as process solvent will now be described. A subsequent-stage container such as reactor used in a high-temperature and high-pressure field is provided with at least one raw material supplying line in addition to a high-pressure fluid supplying line that is a closed passage.

This process is constituted by a 4-cylinder (high-pressure device) as a high-pressure generating device, a reactor 1 contributing to a process field, and an evaporator 5 and condenser 4 used for circulating water similarly to the above-mentioned supercritical carbon dioxide example. In this example, also, a heat-transfer pipe 141 is set to recover the thermal energy of the high-pressure generating device by a heater for effective use.

TABLE 2

Operation Example of Supercritical Water Processing (Temp: ° C., Press: MPa)

| Operation of High-pressure Device | | High-pressure device | | | | | | | |
|---|---|---|---|---|---|---|---|---|---|
| | | 1st high-pressure device (20 L) | | 2nd high-pressure device (20 L) | | 3rd high-pressure device (20 L) | | 4th high-pressure device (20 L) | |
| | | Temp | Press | Temp | Press | Temp | Press | Temp | Press |
| Cycle 1 | Connection Heating Discharge Pressure lowering | 200 | 1.555 | 200 | 1.555 | 200 | 1.555 | 200 | 1.555 |
| Cycle 2 | Connection Heating Discharge Pressure lowering | 200 > 402 | 30.9 | 200 | 1.555 | 200 | 1.555 | 200 | 1.555 |
| Cycle 3 | Connection Heating Discharge Pressure lowering | 402 > 501 | 31 | 200 > 402 | 30.9 | 200 | 1.555 | 200 | 1.555 |
| Cycle 4 | Connection Heating Discharge Pressure lowering | 501 > 203 | 1.655 | 402 > 501 | 31 | 200 > 402 | 30.9 | 200 | 1.555 |
| Cycle 5 | Connection Heating Discharge Pressure lowering | 200 | 1.555 | 501 > 203 | 1.655 | 402 > 501 | 31 | 200 > 402 | 30.9 |
| Cycle 6 | Connection Heating Discharge Pressure lowering | 200 > 402 | 30.9 | 200 | 1.555 | 501 > 203 | 1.655 | 402 > 501 | 30.9 |

| Operation of High-pressure Device | Reactor (20 L) | | Evaporator (50 L) | | Condenser (50 L) | | Heat-transfer pipe (0.5 L) | |
|---|---|---|---|---|---|---|---|---|
| | Temp | Press | Temp | Press | Temp | Press | Temp | Press |

TABLE 2-continued

Operation Example of Supercritical Water Processing (Temp: °C., Press: MPa)

| | | | | | | | | | |
|---|---|---|---|---|---|---|---|---|---|
| Cycle 1 | Connection Heating Discharge Pressure lowering | 200 | 1.555 | 200 | 1.555 | 200 | 1.555 | 200 | 1.555 |
| Cycle 2 | Connection Heating Discharge Pressure lowering | 200 | 1.555 | 200 | 1.555 | 200 | 1.555 | 200 | 1.555 |
| Cycle 3 | Connection Heating Discharge Pressure lowering | 400 | 30 | 203 | 1.655 | 200 | 1.555 | 200 | 1.555 |
| Cycle 4 | Connection Heating Discharge Pressure lowering | 400 | 30 | 203 | 1.655 | 200 | 1.555 | 200 →501 →203 | 1.555 >31 >1.655 |
| Cycle 5 | Connection Heating Discharge Pressure lowering | 400 | 30 | 203 | 1.655 | 200 | 1.555 | 200 →501 →203 | 1.555 >31 >1.655 |
| Cycle 6 | Connection Heating Discharge Pressure lowering | 400 | 30 | 203 | 1.655 | 300 | 1.555 | 200 →501 →203 | 1.555 >31 >1.655 |

An operation example is shown in Table 2. Saturated water in a pressure of 1.555 MPa is supplied to the whole system as operation preparation (Cycle 1). All the valves are opened to lay the whole system in a communicating state. The temperature and pressure of water in each component equipment were 200° C. and 1.555 MPa. The heating of the 1st high-pressure device 31 is started (Cycle 2). The valve 111 between the 1st high-pressure device 31 and the condenser is closed, and the valves 112, 113, and 114 between each of the 2nd high-pressure device 32, the 3rd high-pressure device 33 and the 4th high-pressure device 34 and the condenser 4 are opened. The pressure control valves 91, 92, 93 and 94 and the valves 101, 102, 103 and 104 are laid also in the closed state. The 1st high-pressure device 31 instantaneously reaches a prescribed pressure because it is heated in the heat-insulating container. In this case, the heating required for the arrival of a pressure (primary pressure releasing pressure) 31 MPa set by the pressure control valve 91 was 402° C. Namely, when the 1st high-pressure device reaches 31 MPa as shown in FIG. 4, the pressure control valve 91 attached thereto is operated to supply the water (supercritical water) in the 1st high-pressure device 31 to the reactor that is the processing container 1 set to 400° C. while insulating heat (Cycle 3). In the stage of Cycle 3, the 1st high-pressure device 31 is in a discharging state for supplying supercritical water to the reactor 1, and the operation is continued until 500° C. that is the set temperature of the 1st high-pressure device 1 is attained. In this process, the valve 112 is also closed to transfer the 2nd high-pressure device 32 into a heating state.

Figure 5:
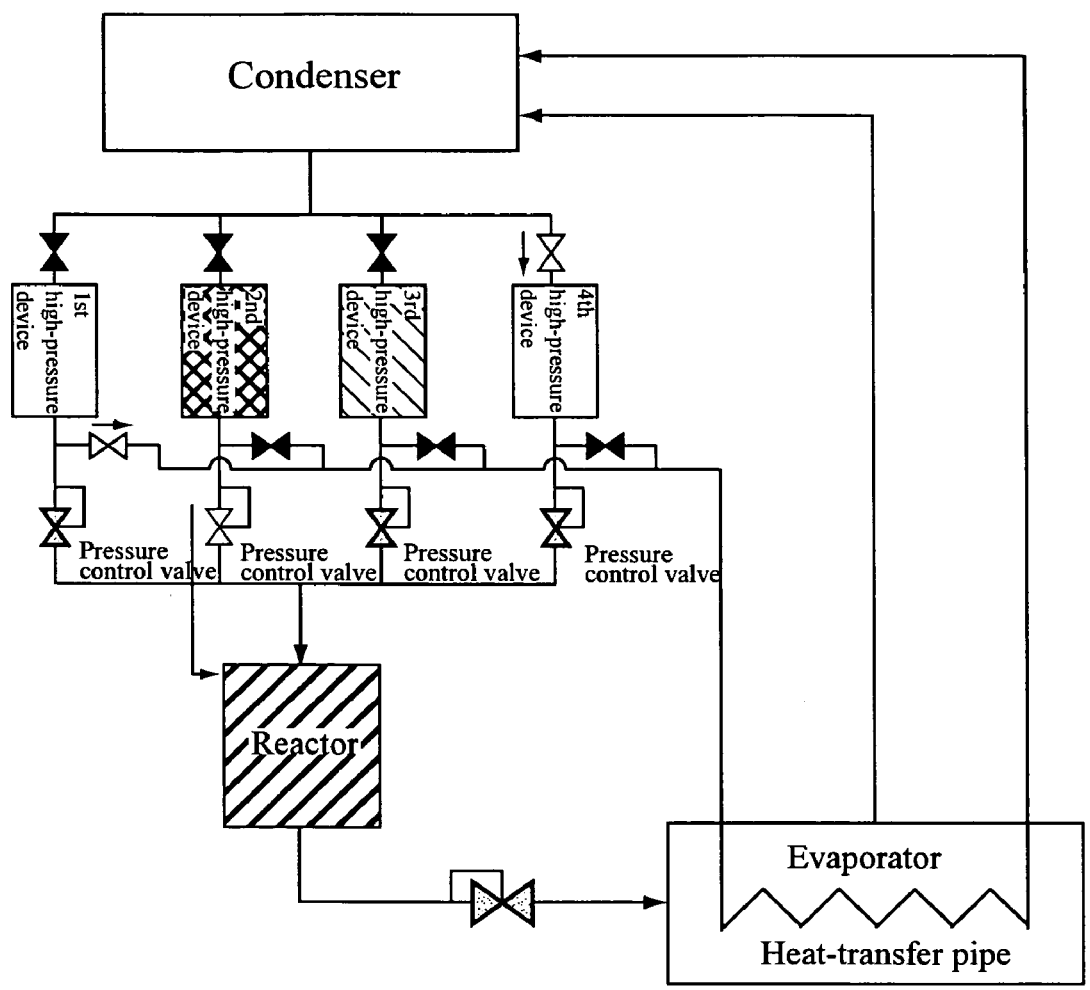
FIG. 5 is a processing flow chart (system flow) in the device for processing supercritical and subcritical fluid of FIG. 1.

When reaching 500° C. that is the set temperature of the 1st high-pressure device 31, the valve 101 is opened to carry the fluid in the 1st high-pressure device 31 to the condenser 4 through the flow passage 14 and the evaporator 5, as shown in FIG. 5, and a pressure lowering operation is executed so as to have the same pressure as the condenser 4 (Cycle 4). At the end of the stage of Cycle 4, the temperature and pressure of the water in the 1st high-pressure device 31 are returned to 203° C. and 1.655 MPa. In the stage of Cycle 4, the pressure control valve 92 is opened, and the supply of water to the reactor 1 is switched to the 2nd high-pressure device 32 which reaches a prescribed pressure.

When the pressure of the 1st high-pressure device 31 is equal to that of the condenser 4, the valve 111 is opened as shown in FIG. 6 to connect it with the condenser 4, and water is supplied to the 1st high-pressure device 31 (Cycle 5). In the stage of Cycle 5, the supply of water to the reactor 1 is switched to the 3rd high-pressure device 33, and the 2nd high-pressure device 32 is transferred to the pressure lowering operation similarly to the 1st high-pressure device 31.

The 1st high-pressure device 31 is then subjected to the heating operation again as shown in FIG. 7 (Cycle 6), and the 2nd high-pressure device 32 is also transferred to a saturated water supplying state by the connection to the condenser 4 and the 3rd high-pressure device 33 is also transferred to the pressure lowering operation, each other. In the stage of Cycle 6, the supply of water to the reactor 1 is switched to the 4th high-pressure device 34.

The above operation is repeated, whereby supercritical water is continuously supplied to the reactor 1.

A working example of a supercritical water microreactor processing for supplying supercritical water to a 0.1 cc-microreactor by using water as process solvent is then described based on FIGS. 8-13. The process comprises a reactor tube 1 as processing container, a liquid receiving tank 16 and a preheating pipe 2 in addition to a 4-cylinder (high-pressure device) as high-pressure generating device similarly to the above-mentioned examples. In this example, not the circulating system structure but a one-through structure is adapted for water flow.

TABLE 3

Operation Example of Supercritical Water Microreactor Processing (Temp: ° C., Press: MPa)

| | | High-pressure device | | | | | | | |
|---|---|---|---|---|---|---|---|---|---|
| Operation of High-pressure | | 1st high-pressure device (50 cc) | | 2nd high-pressure device (50 cc) | | 3rd high-pressure device (50 cc) | | 4th high-pressure device (50 cc) | |
| | Device | Temp | Press | Temp | Press | Temp | Press | Temp | Press |
| Cycle 1 | Connection Heating Discharge Pressure lowering | 20 | 0.002 | 20 | 0.002 | 20 | 0.002 | 20 | 0.002 |
| Cycle 2 | Connection Heating Discharge Pressure lowering | 20 > 56.1 | 31 | 20 | 0.002 | 20 | 0.002 | 20 | 0.002 |
| Cycle 3 | Connection Heating Discharge Pressure lowering | 56.1 > 500.5 | 31 | 20 > 56.1 | 31 | 20 | 0.002 | 20 | 0.002 |
| Cycle 4 | Connection Heating Discharge Pressure lowering | 500.5 > 20 | 0.002 | 56.1 > 500.5 | 31 | 20 > 56.1 | 31 | 20 | 0.002 |
| Cycle 5 | Connection Heating Discharge Pressure lowering | 20 | 0.002 | 500.5 > 20 | 0.002 | 56.1 > 500.5 | 31 | 20 > 56.1 | 31 |
| Cycle 6 | Connection Heating Discharge Pressure lowering | 20 > 56.1 | 31 | 20 | 0.002 | 500.5 > 20 | 0.002 | 56.1 > 500.5 | 31 |

| Operation of High-pressure | | Preheating pipe (10 cc) | | Reactor (0.1 cc) | | Liquid receiving tank (100 cc) | |
|---|---|---|---|---|---|---|---|
| | Device | Temp | Press | Temp | Press | Temp | Press |
| Cycle 1 | Connection Heating Discharge Pressure lowering | 20 | 0.002 | 20 | 0.002 | 20 | 0.002 |
| Cycle 2 | Connection Heating Discharge Pressure lowering | 20 >401.3 | 30.5 | 20 >400 | 30 | 20 >100 | 0.101 |
| Cycle 3 | Connection Heating Discharge Pressure lowering | 401.3 | 30.5 | 400 | 30 | 100 | 0.101 |
| Cycle 4 | Connection Heating Discharge Pressure lowering | 401.3 | 30.5 | 400 | 30 | 100 | 0.101 |
| Cycle 5 | Connection Heating Discharge Pressure lowering | 401.3 | 30.5 | 400 | 30 | 100 | 0.101 |
| Cycle 6 | Connection Heating Discharge Pressure lowering | 401.3 | 30.5 | 400 | 30 | 100 | 0.101 |

Figure 8:
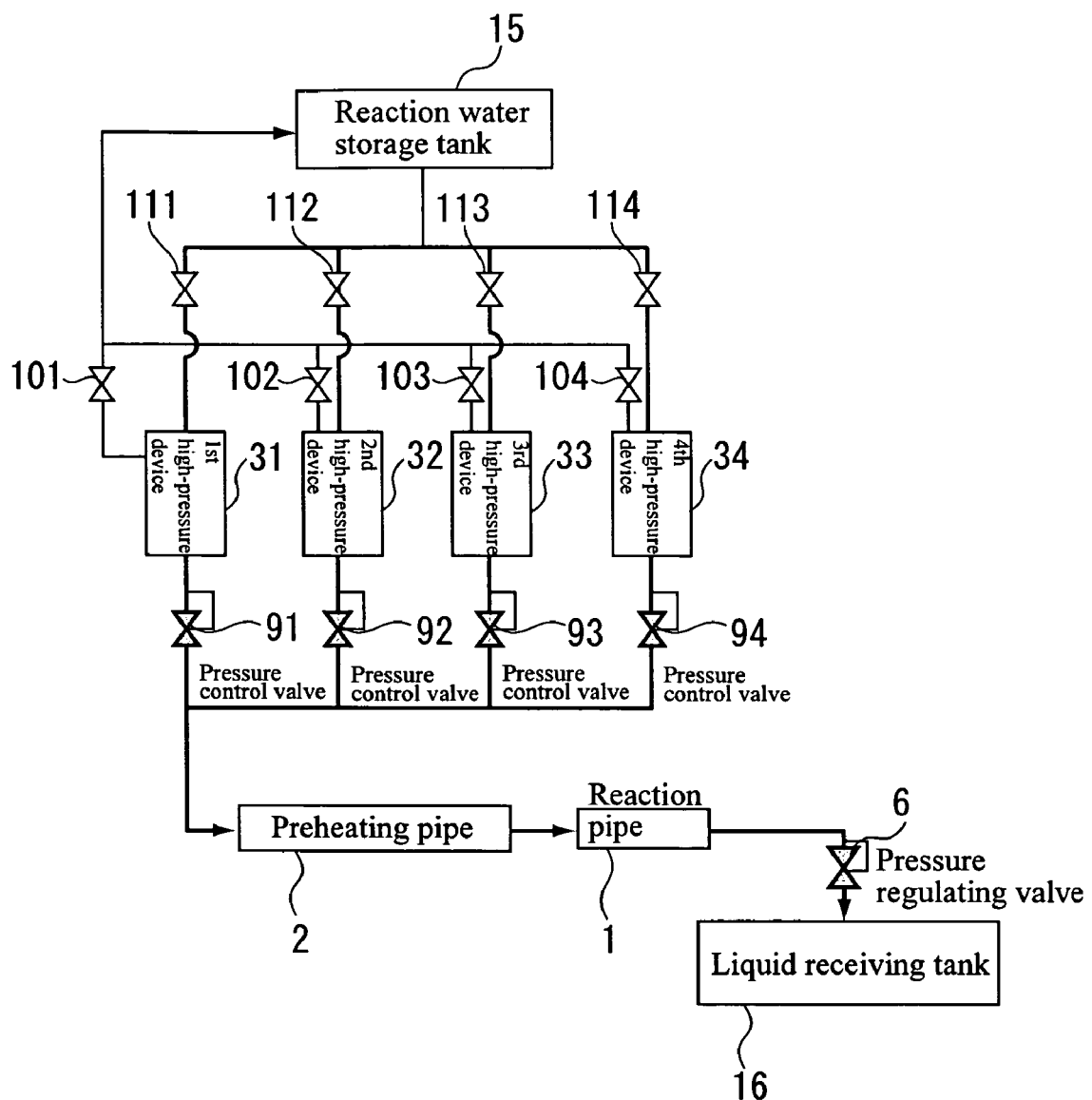
FIG. 8 is a processing flow chart (system flow) in a one-way type device for processing supercritical and subcritical fluid.
Figure 9:
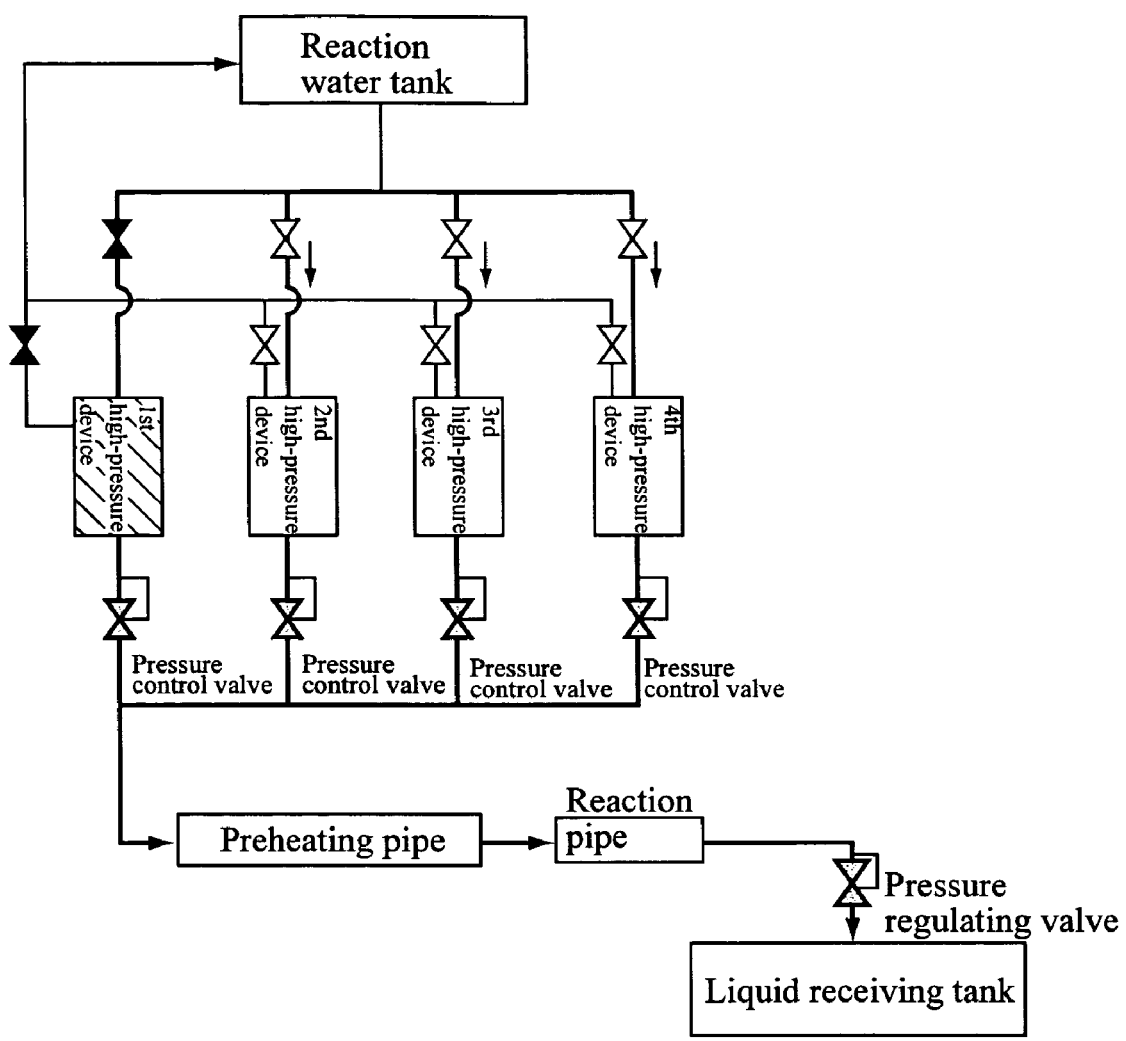
FIG. 9 is a processing flowchart (system flow) in the one-way type device for processing supercritical and subcritical fluid.

An operation example is shown in Table 3. As shown in FIG. 8, water having a temperature of 20° C. is supplied to the whole system as operation preparation (Cycle 1). All the valves are opened to lay the whole system in a communicating state. The heating of the 1st high-pressure device 31 is started as shown in FIG. 9 (Cycle 2). In this case, the valves 101 and 111 between the 1st high-pressure device 31 and a reaction water storage tank 15 are closed, and the valves 102, 112, 103, 113, 104 and 114 between each of the 2nd high-pressure device 32, the 3rd high-pressure device 33 and the 4th high-pressure device 34 and the reaction water storage tank 15 are opened.

Figure 10:
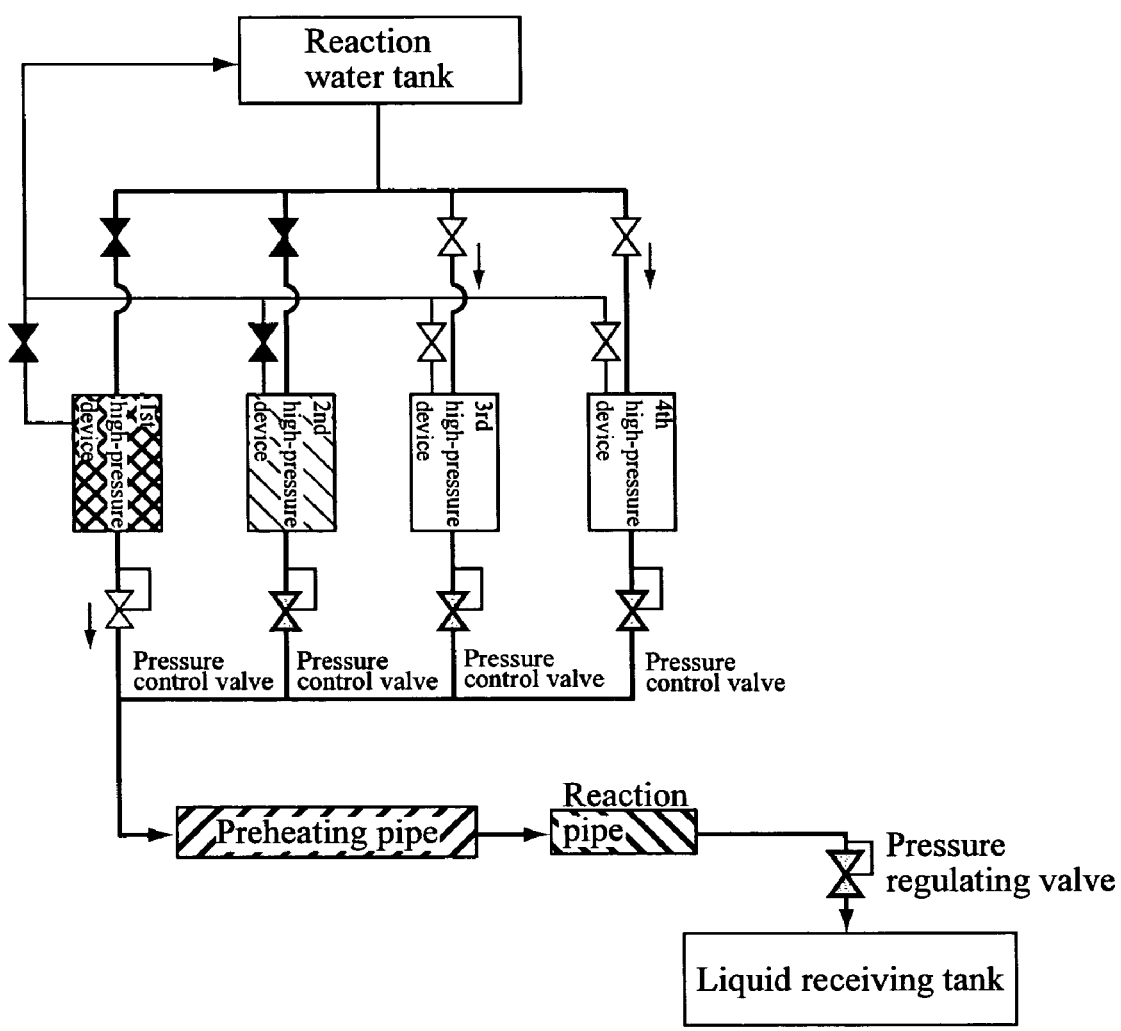
FIG. 10 is a processing flowchart (system flow) in a one-way type device for processing supercritical and subcritical fluid.

The 1st high-pressure device 31 instantaneously reaches a prescribed pressure because it is heated within the heat-insulating container. The heating required for the arrival of 31 MPa set by a pressure control valve 91 was 56° C. When the 1st high-pressure device 31 reaches 31 MPa, the pressure control valve 91 attached thereto is operated, as shown in FIG. 10, and the water (supercritical water) in the 1st high-pressure device 31 is supplied to the preheating pipe 2 and the reacting pipe 1 set to 400° C. while insulating heat (Cycle 3). In the stage of Cycle 3, the 1st high-pressure device 31 is in a discharging state for supplying high-pressure water to the preheating pipe 2 and the reacting pipe 1, and the operation is continued up to 500° C. that is the set temperature of the 1st high-pressure device 31. In this process, the 2nd high-pressure device 32 is also laid in a heating state.

Figure 11:
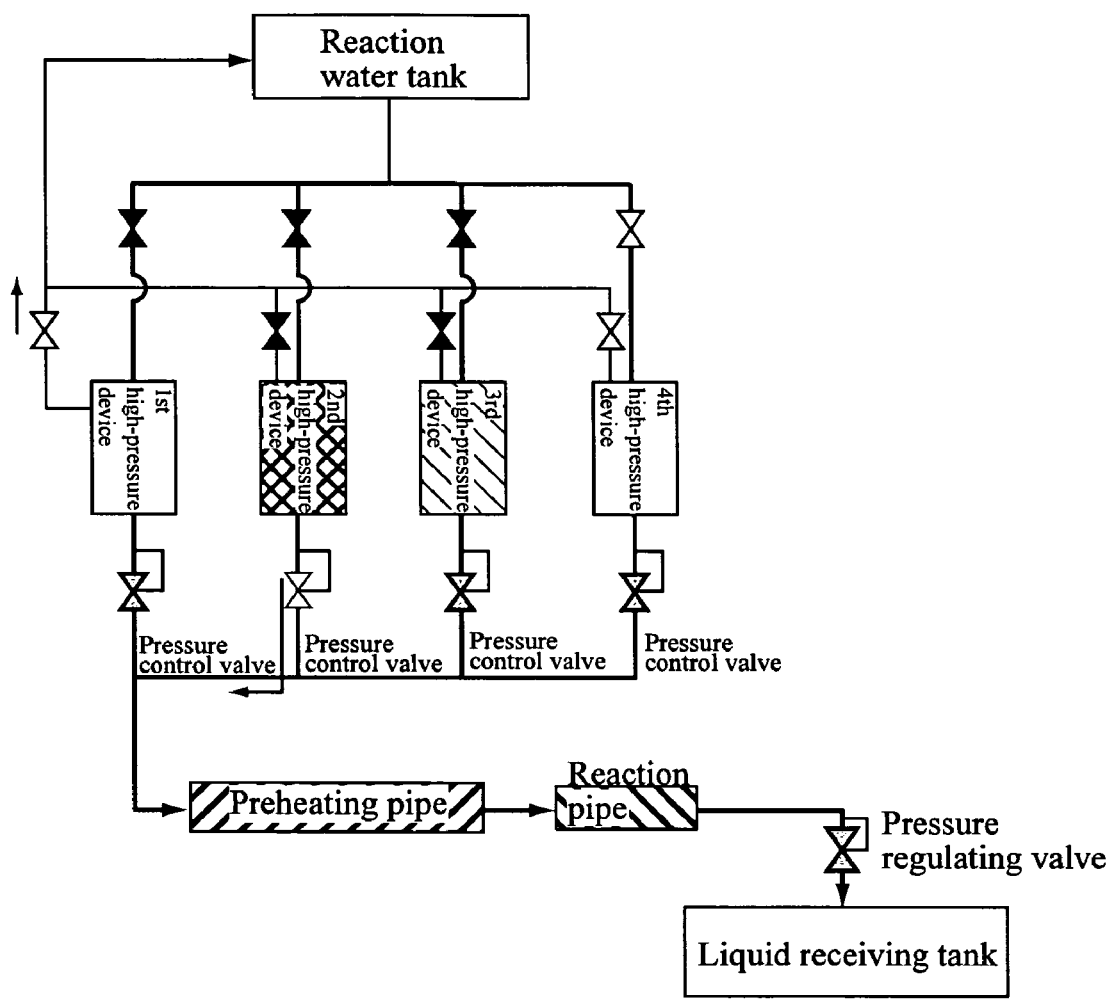
FIG. 11 is a processing flowchart (system flow) in the one-way type device for processing supercritical and subcritical fluid.

When the 1st high-pressure device 31 reaches 500° C. that is the set temperature, the valve 101 is opened, as shown in FIG. 11, to start pressure lowering operation (Cycle 4). In the stage of Cycle 4, the supply of water to the preheating pipe 2 and the reacting pipe 1 is switched to the 2nd high-pressure device 32.

Figure 12:
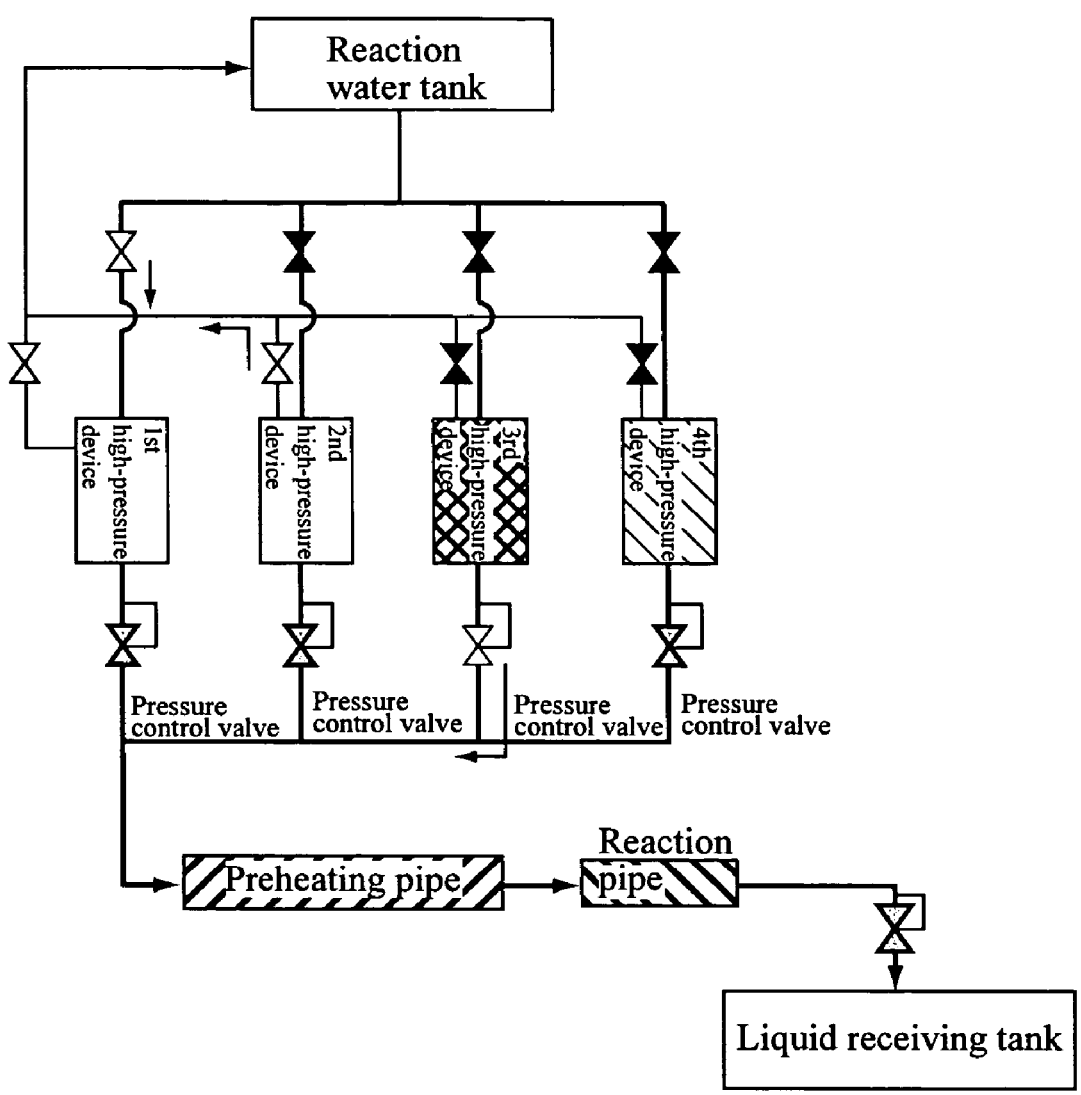
FIG. 12 is a processing flowchart (system flow) in the one-way type device for processing supercritical and subcritical fluid.

When the pressure of the 1st high-pressure device 31 is equal to that of the reaction water storage tank 15, water of 20° C. is supplied, as shown in FIG. 12, from the reaction water storage tank 15 to the 1st high-pressure device 31 (Cycle 5). In the stage of Cycle 5, the supply of water to the preheating pipe 2 and the reacting pipe 1 is switched to the 3rd high-pressure device 33, and the 2nd high-pressure device 32 is transferred to the pressure lowering operation by opening the valve 102.

Figure 13:
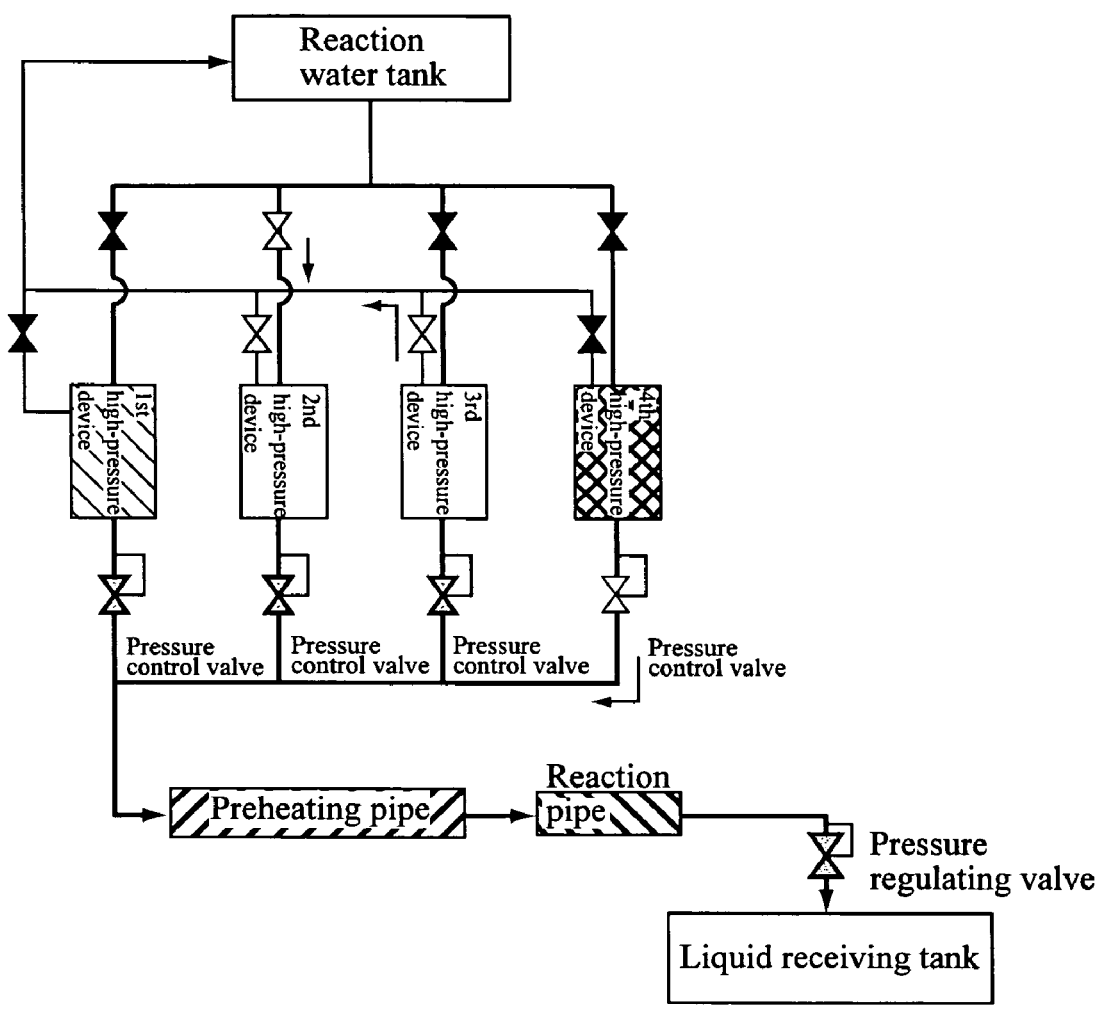
FIG. 13 is a processing flowchart (system flow) in the one-way type device for processing supercritical and subcritical fluid.

As shown in FIG. 13, the 1st high-pressure device 31 is then subjected to heating operation again (Cycle 6), and the 2nd high-pressure device 32 is also transferred to water supplying state by the connection to the reaction water storage tank 15 and the 3rd high-pressure device 33 is also transferred to the pressure lowering operation, each other. In the stage of Cycle 6, the supply of water to the preheating pipe 2 and the reacting pipe 1 is switched to the 4th high-pressure device 34.

The above operation is repeated, whereby the supercritical water is continuously supplied to the preheating pipe 2 and the reaction pipe 1. The water lowered in pressure at the outlet of the reactor was about 100° C.

In the present invention constituted as described above, the processing can be extremely efficiently executed without using a conventional compressor such as pump in the use of supercritical or subcritical fluid as various process solvents. This invention enables the enhancing of efficiency of process and the resultant reduction in device cost in the industrialization of a process using supercritical fluid which is expected from the point of environmental problems, and further enables the production of a specific high-pressure device which was difficult to produce because of various legal limitations. Further, it can be an effective means for putting the development of various synthetic processes using microreactor into effect.

DESCRIPTION OF REFERENCE NUMERALS

1: Reactor, reacting pipe (processing container)
2: Preheater/precooler, preheating pipe
3: High-pressure device
  31: 1st high-pressure device
  32: 2nd high-pressure device
  33: 3rd high-pressure device
  34: 4th high-pressure device
4: Condenser
5: Evaporator
6, 7, 8: Pressure regulating valve
91, 92, 93, 94: Pressure regulating valve
101, 102, 103, 104: Valve
111, 112, 113, 114: Valve
12, 13, 14: Flow passage
15: Reaction water storage tank
16: Pressure regulating valve

The invention claimed is:

1. A system for processing supercritical and subcritical fluid capable of bringing the inside of at least one processing container formed in a circulating closed loop flow passage into a supercritical or subcritical high pressure condition, wherein the closed loop encompasses high pressure devices, at least one processing device, an evaporator, a condenser and heat exchange pipes directly connecting the high pressure devices, evaporator and condenser, and wherein a thermal operation is applied to process fluid to cause a thermal expansion of the fluid to produce a pressure difference between the inside condition and the outside of the processing container, whereby temperature and high pressure conditions suitable for processing of the supercritical or subcritical fluid are generated in the processing container by said thermal operation and without a compressing pump.

2. The system for processing supercritical and subcritical fluid according to claim 1, wherein fluid filled in a high-pressure device connected to the processing container through a flow passage is heated to generate thermal expansion in the high-pressure device, and the fluid is driven into the processing container by pressure generated by the thermal expansion.

3. The system for processing supercritical and subcritical fluid according to claim 2, wherein at least two high-pressure devices are connected to the processing container through flow passages, and when at least one high-pressure device thereof supplies fluid into the processing container, the other high-pressure devices are placed in a thermal expansion process in the high-pressure devices or in a fluid feed waiting state.

4. The system for processing supercritical and subcritical fluid according to claim 1, wherein the flow passages including the processing container and the high-pressure devices comprise a circulating closed loop path, and the fluid is circulated so that at least the fluid passed through the processing container and the high-pressure devices is returned to the condenser, and refilled in the high-pressure device.

5. The system for processing supercritical and subcritical fluid according to claim 4, wherein the high-pressure device has a valve controlled flow passage for filling the fluid from the condenser, a valve controlled flow passage connected to the processing container, and a valve controlled flow passage connected to the condenser.

6. The system for processing supercritical and subcritical fluid according to claim 1, wherein the fluid comprises water, an alcohol, a hydrocarbon, or a liquefied gas, or a mixture thereof.

7. The system according to claim 6, wherein the alcohol is selected from the group consisting of methanol, ethanol and propanol.

8. The system according to claim 6, wherein the hydrocarbon is selected from the group consisting of paraffin and olefin.

9. The system according to claim 6 wherein the liquid gas comprises carbon dioxide or ammonia.

10. The system for processing supercritical and subcritical fluid according to claim 2, wherein the flow passages including the processing container and the high-pressure devices comprise a circulating closed loop path, and the fluid is circulated so that at least the fluid passed through the processing container and the high-pressure devices is returned to the condenser, and refilled in the high-pressure device.

11. The system for processing supercritical and subcritical fluid according to claim 10, wherein the high-pressure device has a valve controlled flow passage for filling the fluid from the condenser, a valve controlled flow passage connected to the processing container, and a valve controlled flow passage connected to the condenser.

12. A device for processing supercritical and subcritical fluid capable of bringing the inside of at least one processing container formed in a circulating closed loop flow passage into a supercritical or subcritical high pressure condition, the device comprising at least two heatable high-pressure devices, an evaporator, a condenser and flow channels including heat exchange pipes directly connecting the high pressure devices, evaporator and condenser, the respective flow passages having valve devices, and the opening and closing timings of the valve devices being controlled so that other pressure-devices are placed in a thermal expanding process in the high-pressure devices or in a fluid feed waiting state when at least one pressure device thereof supplies the fluid into the processing container, whereupon a supercritical or subcritical fluid condition are generated in the processing container by said thermal expanding process without a compressing pump.

13. The device for processing supercritical and subcritical fluid according to claim 12, wherein a liquid storage part is connected to at least an upstream side of the high-pressure device through a valve, the processing container is connected to a downstream side through a valve, and both the valves are at least temporarily closed in heating of the high-pressure device to raise the internal pressure of the high-pressure device to a prescribed pressure.

14. The device for processing supercritical and subcritical fluid according to claim 13, wherein the processing container is used as an extractor, a reactor, a cleaner, a dyeing machine or a crystallizer, or an extractor, a reactor, a cleaner, a dyeing machine or a crystallizer is attached to the processing container.

15. The device for processing supercritical or subcritical fluid according to claim 13, wherein the flow passages including the processing container and the high-pressure device comprise a circulating closed loop path including an evaporator and a condenser, and the fluid is circulated so that at least the fluid passed through the processing container and the high-pressure device is returned to the evaporator and the condenser, and refilled in the high-pressure device.

16. The device for processing supercritical and subcritical fluid according to claim 12, wherein the processing container is used as an extractor, a reactor, a cleaner, a dyeing machine or a crystallizer, or an extractor, a reactor, a cleaner, a dyeing machine or a crystallizer is attached to the processing container.

17. The device for processing supercritical or subcritical fluid according to claim 16, wherein the flow passages including the processing container and the high-pressure device comprise a circulating closed loop path including an evaporator and a condenser, and the fluid is circulated so that at least the fluid passed through the processing container and the high-pressure device is returned to the evaporator and the condenser, and refilled in the high-pressure device.

18. The device for processing supercritical or subcritical fluid according to claim 12, wherein the flow passages including the processing container and the high-pressure device are comprised as a circulating closed loop path including an evaporator and a condenser, and the fluid is circulated so that at least the fluid passed through the processing container and the high-pressure device is returned to the evaporator and the condenser, and refilled in the high-pressure device.

* * * * *